United States Patent
Amstutz et al.

(10) Patent No.: US 11,720,065 B2
(45) Date of Patent: Aug. 8, 2023

(54) DEVICE FOR MEASURING A HOROLOGICAL COMPONENT

(71) Applicant: ROLEX SA, Geneva (CH)

(72) Inventors: Mathieu Amstutz, Les Brenets (CH); Rowan Luthi, Bienne (CH); Christian Mougin, Bienne (CH); Olivier Perrinjaquet, Savagnier (CH); Yves Salvadé, Saint Imier (CH)

(73) Assignee: ROLEX SA, Geneva (CH)

( * ) Notice: Subject to any disclaimer, the term of this patent is extended or adjusted under 35 U.S.C. 154(b) by 2 days.

(21) Appl. No.: 17/343,049

(22) Filed: Jun. 9, 2021

(65) Prior Publication Data
US 2021/0397136 A1   Dec. 23, 2021

(30) Foreign Application Priority Data
Jun. 19, 2020   (EP) .................. 20181027.2

(51) Int. Cl.
*G01B 13/00* (2006.01)
*G04D 7/00* (2006.01)
(Continued)

(52) U.S. Cl.
CPC ............... *G04D 7/00* (2013.01); *G01B 11/02* (2013.01); *G01B 11/08* (2013.01); *G01B 13/04* (2013.01); *G01B 13/08* (2013.01)

(58) Field of Classification Search
CPC ....... G01B 11/02; G01B 11/08; G01B 11/043; G01B 11/105; G01B 11/2433; G01B 13/04; G01B 13/08
See application file for complete search history.

(56) References Cited

U.S. PATENT DOCUMENTS 4,416,541 A   11/1983 Studer
6,285,034 B1   9/2001 Hanna et al.
(Continued)

FOREIGN PATENT DOCUMENTS

DE   102004047847 A1   4/2005
EP   1127244   8/2001
(Continued)

OTHER PUBLICATIONS

"Light-Emitting Diodes: A Primer", <<https://www.photonics.com/Articles/Light-Emitting_Diodes_A_Primer/a36706>>, accessed Oct. 4, 2022. (Year: 2022).*
(Continued)

Primary Examiner — Rebecca C Bryant
(74) Attorney, Agent, or Firm — Seckel IP, PLLC (57) ABSTRACT

A device for measuring a horological component comprising a measurement cell, at least two optical systems and a driver unit. The measurement cell comprises a measurement channel filled with a liquid and flat and parallel faces. Each optical system comprises a light emitter suitable for emitting a light in a predefined wavelength so as to illuminate a horological component that is present and being displaced in the measurement channel in the measurement zone and an optical sensor associated with said light emitter to receive at least a part of the light emitted by said light emitter. The optical systems operate in different respective wavelengths. The driver unit drives the optical systems and processes the digital data obtained from the optical systems. It is configured to implement calculations of at least one measurement of a horological component.

21 Claims, 3 Drawing Sheets

(51) Int. Cl.
  *G01B 11/02* (2006.01)
  *G01B 11/08* (2006.01)
  *G01B 13/04* (2006.01)
  *G01B 13/08* (2006.01)

(56) References Cited

U.S. PATENT DOCUMENTS 10,175,036 B2 *   1/2019   Mougin ................. G01B 11/00
2017/0003112 A1   1/2017   Mougin et al.

FOREIGN PATENT DOCUMENTS

EP   3112800   A2   1/2017
GB   2145852   A    4/1985
WO   0026616   A1   5/2000

OTHER PUBLICATIONS

European Search Report and Written Opinion dated Nov. 25, 2020 in priority application No. EP20181027.2; with English machine translation (total 15 pages).

* cited by examiner

DEVICE FOR MEASURING A
HOROLOGICAL COMPONENT

This application claims priority of European patent application No. EP20181027.2 filed Jun. 19, 2020, the content of which is hereby incorporated by reference herein in its entirety.

The present invention relates to a device for measuring a horological component. It also relates to a device for manufacturing a horological component. It also relates to a method for measuring a horological component, and to a method for manufacturing a horological component.

Horological components are often manufactured by machining using a machine-tool allowing complex shapes to be manufactured with great precision. There is an ongoing desire to further enhance the precision of such a manufacturing method. For that, it is known practice to proceed with regular checks of the manufactured components, by measurement thereof, to check the conformity of the manufactured components and to optimize the settings of the machine-tool used. The measurements of such components do however add extra complexity to the manufacturing method, for example by demanding the positioning of the components on a specific measurement platform or an adaptation of the machining unit to allow a measurement with the component still held, and/or by requiring the cleaning of the components as they leave the machine-tool, from which they leave covered with the cutting oil used by the machine-tool. These measurements thus generally result in a slowing-down of the manufacturing method and render implementation cumbersome.

The existing solutions for enhanced precision in the manufacturing of the horological components during their machining by a machine-tool are not therefore satisfactory.

Thus, the object of the present invention is to propose a solution that allows the precision to be optimized during the machining of the horological components by a rapid and simple measurement of the components.

More specifically, the object of the invention is to propose a solution that allows the machining of a horological component to be optimized without slowing down, or burdening, the method for manufacturing the horological component.

A subject of the invention is also a solution for the rapid, accurate and reliable measurement of at least one dimension of a horological component.

To this end, the invention is based on a device for measuring a horological component, wherein it comprises:
  a. a measurement cell comprising:
    i. a measurement channel extending in a longitudinal direction and filled with a liquid, capable of displacing a horological component;
    ii. outer faces that are flat and parallel pairwise,
  b. at least two optical systems arranged opposite at least a part of the outer faces of the measurement cell in a measurement zone of the measurement cell, each optical system comprising:
    i. a light emitter suitable for emitting a light, notably collimated in a predefined wavelength or a predefined polarization, in the direction of the measurement channel through an outer face of the measurement cell, so as to illuminate a horological component present and being displaced in the measurement channel in the measurement zone, and
    ii. an optical sensor associated with said light emitter for receiving at least a part of the light emitted by said light said at least two optical systems comprising respective light emitters operating in different respective wavelengths and/or different respective polarizations,
  c. a driver unit, capable of driving the optical systems and processing the digital data obtained from the optical systems, configured to implement calculations of at least one dimension of a horological component.

The invention also relates to a device for manufacturing a horological component, wherein it comprises a machining unit and a measurement device as described above.

The invention also relates to a method for measuring a horological component, wherein it comprises the following steps:
  setting in motion of a horological component in a liquid in a measurement channel of a measurement cell;
  optionally, detection of the horological component by a detection sensor and transmission of the detection data to a driver unit;
  driving of at least two optical systems by a driver unit for simultaneous images to be taken at the moment of the passage of the horological component in a measurement zone of a measurement cell;
  transmission of digital data representative of the images obtained by the at least two optical systems to a driver unit;
  calculation of at least one dimension of the horological component by a computer of the driver unit from said digital data.

The invention is more particularly defined by the claims.

These objects, features and advantages of the present invention will be explained in detail in the following description of a particular embodiment given in a nonlimiting manner in relation to the attached figures in which.

The invention is based on a device for measuring a horological component which allows a measurement from images taken by optical systems during the displacement of the horological component, and without the need for this horological component to be cleaned on leaving a machining machine-tool. Advantageously, this displacement of the horological component is a free movement, immersed in a liquid. The result thereof is that the invention offers the first advantage of high measurement speed since the measurements performed are carried out on components in motion. Furthermore, it is very simple and easy to implement since the components do not have to be positioned on a specific platform and/or according to a predefined orientation, on the one hand, and since they do not need to be cleaned on the other hand.

Figure 1:
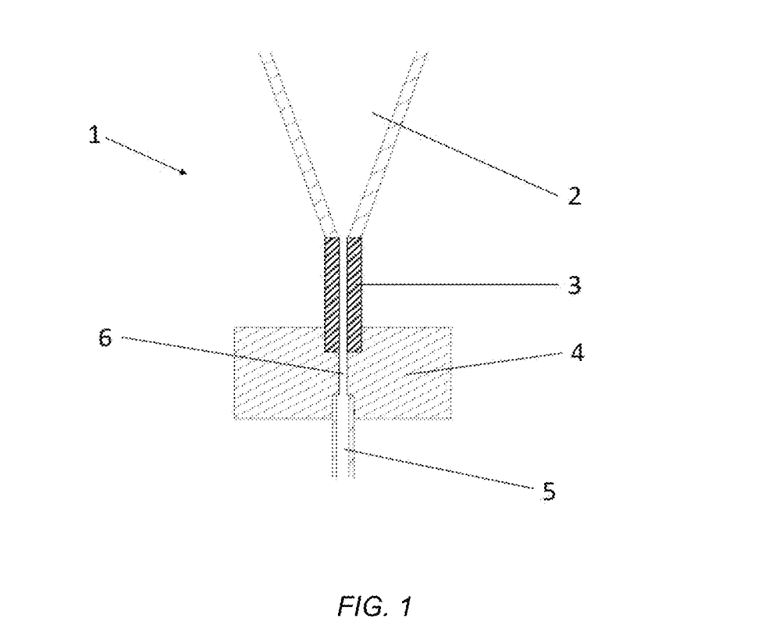
FIG. 1 schematically represents a device for measuring a horological component according to an embodiment of the invention.

FIG. 1 represents a measurement device 1 for horological components according to an embodiment. This device comprises an introduction part 2 for the horological components, which can be positioned directly downstream of a machine-tool 30, that is to say so as to receive the introduction of the horological components as soon as they leave a machining phase by a machine-tool 30. This introduction part 2 has a funnel form. It can have any form allowing a horological component to be guided and/or oriented. This guiding function can be reinforced by any actuation of the introduction part 2, which can take the form of a vibrating bowl, a centrifugal feeder, etc. Preferably, at least a portion of this introduction part 2 is filled with a fluid, for example, to allow the elimination of any air bubbles which would be present on the surface of the horological components upon their introduction into the fluid.

The measurement device 1 then comprises a first transfer structure 3, which allows the horological components to be transferred from the introduction part 2 to a measurement channel 6 of a measurement cell 4, which will be described hereinbelow. The link between the introduction part 2 and the first transfer structure 3 is designed so as to avoid the blocking of the horological components, for example via a suitable geometry and a controlled surface state. This link thus allows the horological components to be guided to the measurement cell 4, preferably according to a chosen orientation imposed by the introduction part 2. Advantageously, the first transfer structure 3 therefore allows the predetermined preferential orientation of the horological components to be maintained. The first transfer structure 3 is preferably likewise filled with a fluid. Thus, the horological components can reach the measurement cell 4 in a position substantially similar to the one that they have in the first transfer structure 3 in a way that is substantially repeatable from one component to another. For that, the first transfer structure 3 for example takes the form of a duct, filled with the abovementioned fluid, of circular or oval section. Furthermore, the internal surface of such a duct is such that it minimizes any disturbance of the flow of the fluid and avoids the blocking of a horological component.

The measurement device 1 finally, optionally, comprises a second transfer structure 5, suitable for transferring a horological component from the measurement cell 4 to a collector that is not represented. Then, the horological components can be conducted to a sorting unit 40 in which the horological components considered to not conform can be discarded. As a variant or in addition, the horological components can also be oriented to a cleaning unit, not represented. This second transfer structure 5 is also advantageously filled with a fluid.

According to the embodiment, the join between the first transfer structure 3, and/or the optional second transfer structure 5, with a measurement channel 6 of the measurement cell 4, has a tapered form, which makes it possible to minimize the risk of a horological component becoming blocked. Preferably, the diameter of the measurement channel 6 of the measurement cell 4 is less than or equal to the diameter of the duct of the transfer structure 3.

As mentioned previously, the first and second transfer structures 3, 5 and the measurement channel 6 of the measurement cell 4 are filled with a fluid. This fluid is preferably a liquid, and preferably a viscous liquid. In addition, a device is provided to keep the overall volume of fluid of the measurement device 1 substantially constant, for example via pumps or any other appropriate system. If necessary, degassers can be provided so as to avoid any presence of air bubbles in the measurement cell 4, which would be likely to disturb the measurements. The fluid is more preferably previously filtered to minimize the presence of particles.

The fluid fulfills an important function in the displacement of the horological components, and its viscosity is controlled. Notably, the temperature of the fluid is then preferably controlled, since it influences the viscosity of the fluid. Such a temperature is, for example, maintained within a range between 20 and 35° C., even preferably between 21 and 25° C. Advantageously, the fluid circulates in a closed or open circuit in the measurement device 1, in laminar state at a predetermined speed that is as constant as possible for its movement not to be able to be perceived by the optical systems of the measurement cell. Such a speed thus makes it possible to contribute to the transfer of the horological components. It makes it possible to not induce discontinuities in the speed of displacement of the horological components in the measurement cell 4. In a variant, the fluid is immobile in the measurement device 1 and the horological components to be measured are displaced for example under the effect of gravity. Advantageously, said measurement channel 6 of the measurement cell 4 is arranged to allow the free displacement of the horological component, in a static liquid by gravitation or by entrainment by the liquid in laminar flow and/or by gravitation, at a controlled constant speed in the measurement channel 6 in the measurement zone.

The kinematic viscosity of the fluid thus makes it possible to control the speed of passage of the horological components in the measurement cell. This speed is chosen notably to allow one or more images of a horological component to be well taken by an optical system. Advantageously, the measurement cell 4 is dimensioned and the fluid is chosen in order for a horological component to be measured to pass through the measurement cell 4 at a speed lying between 70 and 180 mm/s, notably at the optical systems of the measurement cell 4. This speed of displacement has a component that is non-zero in the longitudinal direction of the measurement channel of the measurement cell. Such a speed will thus be compatible with the working frequency of the optical systems. To best achieve the properties described above, the liquid (fluid) advantageously has a kinematic viscosity of between 2 $mm^2/s$ and 50 $mm^2/s$ (at 40° C. according to the DIN 51562-1 standard).

Also, the fluid used has a predetermined kinematic viscosity, similar to the kinematic viscosity of a machining oil used by a machining device (machine-tool 30) for machining a horological component, which makes it possible to dispense with the usually unfavorable environment of the machining zone of a machine-tool, which degrades the accuracy and the repeatability of the measurements when there are still machining residues and/or traces of oil on the horological components, while eliminating the need to clean the horological components before they are measured.

Finally, the fluid is chosen with a predetermined refractive index, an at least partial transparency, in order to be optimal with respect to the optical systems of the measurement cell 4, which will be detailed hereinbelow. Such a fluid is, for example, a mineral fluid, a vegetable oil, an emulsion, a microemulsion, provided that the components of the emulsion have similar refractive indices, a synthetic fluid, etc. Ideally, the fluid is identical to the cutting oil used on the machine-tool 30 from which the component is obtained. Examples of oils known by the trade names Blasomill® (notably Blasomill® 22), Swisscut® otho, Swisscut® Frisco, Swisscut® Decomed, are considered to perform well.

The measurement cell 4 therefore comprises a measurement channel 6 which guides a horological component in its displacement. This measurement channel 6 is filled with the abovementioned fluid. It preferably has an architecture which allows it to optimize the displacement of a horological component and/or of said fluid. For example, it can have a circular or ellipsoid section, or any other form, preferably without sharp edges. Furthermore, its wall preferably has a roughness that does not allow interference with the optical measurement units and that makes it possible to prevent the parts from becoming blocked in the measurement channel. More globally, the dimensions, form and surface roughness of the measurement channel 6 ultimately allow the continuous displacement of a horological component to be promoted, and naturally the blockage thereof to be avoided. Generally, diameter of the measurement channel is the term used to describe the diameter of the measurement channel when its section is circular, or the diameter of the minimum circle within which its section is inscribed if this section of the measurement channel is not circular. Furthermore, maximum diameter of the horological component is the term used for the diameter of a minimum cylinder in which the horological component to be measured would be inscribed. Preferably, the diameter of the measurement channel is greater than the maximum diameter of the horological component, preferably 5% greater than the maximum diameter of the horological component, to avoid any blockage. Furthermore, the diameter of the measurement channel is also preferably less than 1.8 times the maximum diameter of the horological component, to guarantee the detection of the horological component by a passage sensor, which will be detailed hereinbelow.

Figure 2A:
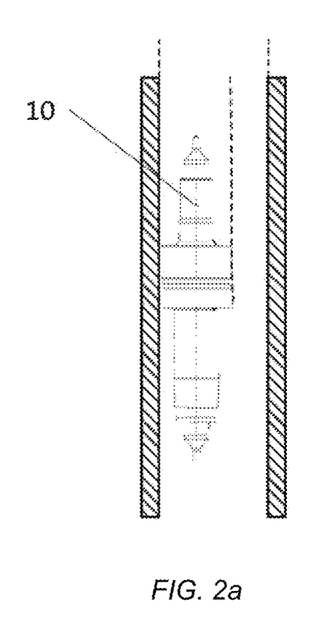
FIGS. 2*a* and 2*b* schematically represent two configurations of displacement of a horological component in a measurement channel of a device for measuring a horological component according to the embodiment of the invention.
Figure 2B:
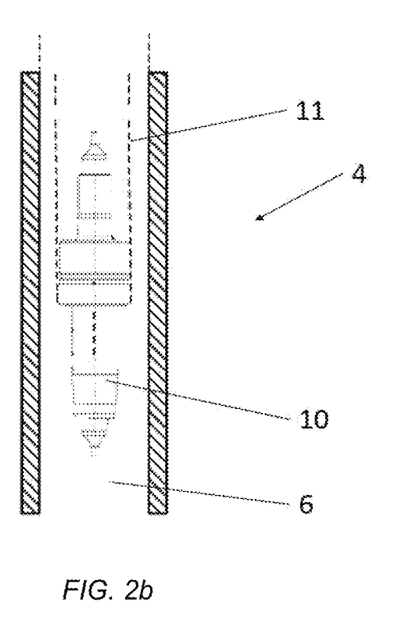

FIGS. 2a and 2b illustrate, by way of example, two configurations of displacement of a balance staff 10 within the same measurement channel 6 of a measurement cell 4. Such a balance staff 10 substantially has a symmetry of revolution about a central axis. It has a maximum section whose diameter corresponds to the maximum diameter of the balance staff, that is to say the minimum diameter of the cylinder 11 in which the balance staff is inscribed, that, here, is called maximum diameter of the balance staff 10 according to the definition explained previously. A balance staff 10 generally has a maximum diameter of between 0.3 and 1.2 mm and a length of between 6 and 8 mm. As an example, for a horological component of revolution of maximum diameter 1.2 mm, a diameter of the measurement channel 6 lying between 1.26 mm and 2.16 mm, typically a diameter of the measurement channel 6 of 1.4 mm, makes it possible to guarantee the detection of the horological component, even when it is pressed onto one side of the channel, as represented in FIG. 2a, while FIG. 2b represents the ideal situation in which the balance staff 10 is displaced at the center of the measurement channel 6 according to an orientation of its length aligned with the longitudinal axis of the measurement channel 6.

Figure 3:
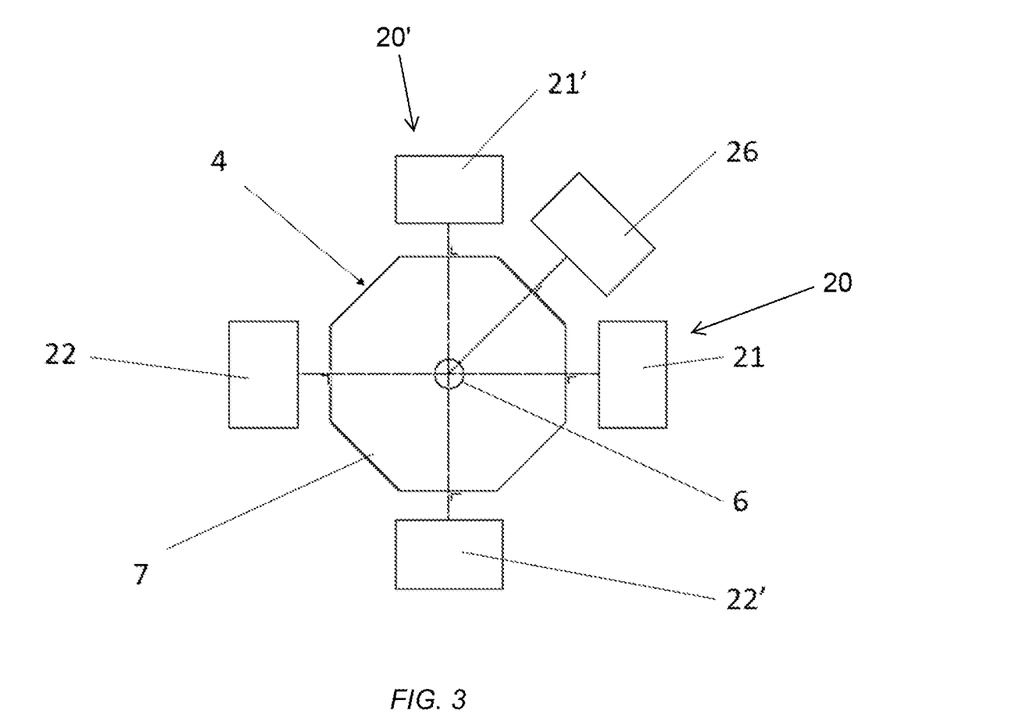
FIG. 3 schematically represents a measurement zone of a device for measuring a horological component according to the embodiment of the invention.
Figure 4:
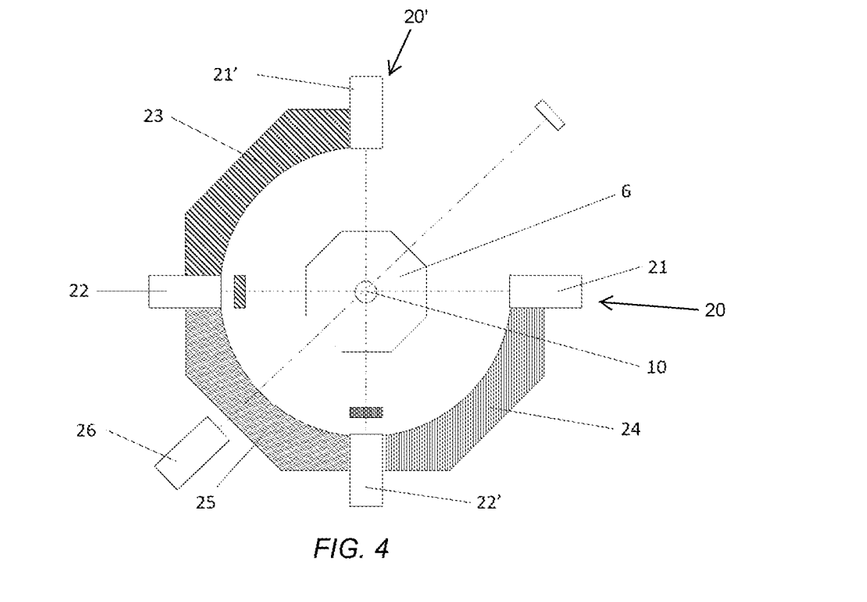
FIG. 4 schematically represents a measurement zone of a device for measuring a horological component according to a variant of the embodiment of the invention.

The measurement cell 4 also comprises at least two optical systems 20, 20', arranged in a measurement zone, as represented in FIGS. 3 and 4. The function of each optical system 20, 20' is to capture one or more images of a horological component passing through the measurement cell 4, in order to allow the estimation of one or more dimensions of the horological component on the basis of these images.

According to the embodiment, each optical system 20, 20' comprises a light emitter 21, 21', preferably to emit a collimated light, operating at a predetermined wavelength, and an optical sensor 22, 22' associated with the light source, for example a high-resolution CCD or CMOS camera. Advantageously, an optical system 20, 20' comprises a light emitter 21, 21' and an associated optical sensor 22, 22' that are aligned, disposed on either side of the measurement cell 4. The optical sensor 22, 22' is thus positioned opposite the light emitter 21, 21', and detects a shadow induced by the horological component positioned on the trajectory of the light beam emitted by the light emitter 21, 21', which allows a very accurate definition of the edges of the horological component to be measured to be obtained.

The optical sensor 22, 22' can be a camera. Advantageously, such a camera is selected to have an image frame frequency greater than or equal to 30 fps (frames per second/images per second) at full resolution. The exposure time is optimized to minimize the blur caused by the speed of displacement of the horological component. For example, with a frame frequency of 30 fps and a horological component being displaced at a speed of 108 mm/s, the exposure time is 16 µs.

According to the embodiment, the measurement cell 4 comprises two optical systems 20, 20'. It could naturally as a variant comprise three or four optical systems. These two optical systems 20, 20' are both arranged in the same plane at right angles to the longitudinal axis of the measurement cell 4. The measurement zone is therefore substantially flat in this embodiment. These at least two optical systems 20, 20' are angularly offset with respect to one another. As represented in FIG. 3, the measurement cell 4 has a polygonal outer section, more specifically octagonal. It thus has outer faces 7 that are flat and parallel pairwise. Each optical system 20, 20' is aligned in a direction at right angles to one of these flat outer faces 7, and preferably substantially centered on one of these flat outer faces 7. According to this embodiment, the two optical systems 20, 20' are oriented at right angles to one another. As a variant, they could be arranged on adjacent faces of the polygonal section, and have an angle between them of 45 degrees. As another variant, the outer section of the measurement cell 4 could have any other polygonal form, for example square, rectangular or hexagonal. The optical systems could thus have between them any other angle, for example 60 degrees, 120 degrees or any other value. The light emitter 21, 21' and the associated optical sensor 22, 22' are arranged at a distance from the measurement cell 4 such that they have a focal plane at the center of the measurement channel 6. Also, the outer faces 7 of the measurement cell 4 have a surface area greater than or equal to the surface area of the field of view of the optical system 20, 20' arranged opposite. Furthermore, the field of view of the optical sensors 22, 22' is adjusted to the dimensions of the horological components to be measured in order for all the dimensions to be determined to be recorded.

Also, the wavelengths or the polarization of the different optical systems 20, 20' are selected such that these optical systems 20, 20' do not interfere with one another, or more generally, with any other optical devices of the measurement device 1. Thus, in the embodiment, the two optical systems 20, 20' are designed not to mutually interfere with one another. The light spectrum of the light emitters 21, 21' of the optical systems 20, 20' can be chosen both in the visible spectrum and in the non-visible spectrum, including the ultraviolet and the infrared. For example, a light emitter 21, 21' can emit in the UV, the violet, the blue, the green, the yellow or the red. The lowest wavelengths can be preferable to reduce the diffraction provoked by the edges of a horological component. Moreover, because the optical systems operate at distinct wavelengths, it becomes possible to limit, even eliminate, artefacts due to the stray reflections of the various light beams and/or increase the sensitivity of the optical sensors 22, 22'.

According to the embodiment, the light emitter 21 of the first optical system 20 operates at a wavelength lying between 435 and 500 nm (blue) and the light emitter 21' of the second optical system 20' operates at a wavelength lying between 495 and 570 (green).

In addition, the optical systems 20, 20' are advantageously equipped with bandpass filters. For example, for an optical system operating in the blue, a bandpass filter operating between 435 and 500 nm (which corresponds to blue lighting) will be selected and, for an optical system operating in the green, a bandpass filter operating between 485 and 565 nm (which corresponds to green lighting) will be selected.

An optical sensor 22, 22' is more advantageously equipped with a spectral filter in order to reduce the potential interactions of the two optical systems 20, 20'. The aim is to conserve the information of the outline of a horological component obtained by the chosen backlit configuration, without being disturbed by the other lighting of the other optical system. The spectral filter is, for example, a suitable bandpass filter. The filter is selected as a function of the relative spectral response of the optical sensor 22, 22' to the predetermined wavelengths, in order to eliminate the potential disturbances due to the other optical systems 20', 20. The filters can be installed between the measurement cell 4 and the optical sensor 22, 22' or directly integrated in the lenses of the optical sensors 22, 22'. Since the diameters of the lenses are much greater than the field of view, it may be advantageous to position a filter between the measurement cell 4 and an optical sensor 22, 22'.

The measurement cell 4 is advantageously a monoblock piece. It can take the form of a block of prismatic material that is at least partially transparent with a polygonal base, arranged around an axis of symmetry. A measurement channel (or central channel) is arranged at the center of this block, preferably centered on the axis of symmetry. Preferably, the axis of the channel is substantially parallel to the outer faces 7. The outer surface therefore comprises a polygonal section, as detailed previously. The length of the measurement cell is, further, dimensioned such that the surface area of each outer face 7 of the measurement cell 4 is greater than or equal to the surface area of the field of view of an optical system 20, 20' opposite.

As mentioned previously, the outer surface of the measurement cell 4 can take different polygonal forms. It comprises at least as many pairs of opposing parallel outer faces 7 as optical systems and possibly other sensors. Note that the flat faces of the measurement cell 4 also facilitate the positioning and the alignment of the optical sensors 22, 22'. Thus, for a measurement cell 4 comprising two or three optical systems 20, 20' and a passage sensor 26, which will be described hereinbelow, the measurement cell advantageously has the form of a prism with octagonal base, which facilitates the subsequent dimensional calculations. As a variant, the measurement cell can also comprise only two optical systems 20, 20' in one and the same plane. In such a configuration, the measurement cell 4 can have the form of a prism with rectangular or square base.

Also, the measurement cell 4 is designed in a material that is transparent to the wavelengths of the different optical systems 20, 20' and/or of the other optical devices, such as a passage sensor 26.

In addition, its constituent material is preferably homogeneous and isotropic, in order not to disturb the different light beams. Furthermore, the measurement cell 4 advantageously has a predetermined refractive index, designed for good behavior with respect to the optical systems 20, 20'. The following table illustrates, in a nonlimiting manner, a few typical refractive indices of possible materials, at 20° C.

|  | 470 nm | 530 nm | 670 nm |
| --- | --- | --- | --- |
| Quartz | 1.46 | 1.46 | 1.45 |
| PMMA | 1.50 | 1.49 | 1.49 |
| Polycarbonate | 1.60 | 1.59 | 1.58 |
| Glass BK7 (crown) | 1.52 | 1.52 | 1.51 |
| Glass FK51A | 1.49 | 1.49 | 1.49 |
| Sapphire | 1.78 | 1.77 | 1.76 |

Notably, the choice of the material is such that the walls of the measurement channel 6 of the measurement cell 4 form an interface with the fluid filling the measurement channel 6 which is invisible or quasi-invisible for the different optical systems, whether the fluid is immobile or in laminar flow. This result is first of all favored by the surface roughness of these walls of the measurement channel 6: the surfaces of these walls can be ground with a roughness Ra less than or equal to 0.5 µm. Also the refractive indices, respectively of the fluid filling the measurement channel 6 and of the constituent material of the measurement cell 4, are selected to be substantially equal, at the different wavelengths of the optical systems implemented. In this ideal configuration, they are equal and there is no diffraction at the interface between the fluid and the measurement cell 4. As a variant, they exhibit a small difference, which is imperceptible or almost imperceptible to the optical systems, such that their effect on the measurements is ultimately negligible. For that, the refractive indices of the material of the measurement cell 4 and of the fluid differ advantageously by less than 2%, even by less than 1%, even by less than 0.5%.

The refractive index of the fluid is measured with an Abbe refractometer (587 nm) at 20° C. The following table illustrates, in a nonlimiting manner, a few typical refractive indices of fluids that can be envisaged.

| Fluid | Refractive index at 20° at 587 nm |
| --- | --- |
| Mineral oil | 1.40-1.60 |
| Silicone oil | 1.40-1.60 |
| Blasomill 22 | 1.49 |

In a variant embodiment, the measurement cell 4 consists of several sections produced in different materials, making it possible to minimize the refractive index differences between the measurement cell and the fluid, for each wavelength used by the different optical systems which can be distributed over several sections. The different materials are assembled in the form of joined sections or windows.

The embodiment has been described on the basis of a single measurement cell 4 comprising multiple optical systems. As a variant, it is also possible to arrange several measurement cells 4 in series, each measurement cell being optimized for the measurement of identical or different predetermined dimensions of one and the same horological component.

In a variant embodiment, complementary illumination is used to highlight certain specifics of a horological component to be measured, particularly to illuminate certain zones which would be masked in simple lighting provided by the configuration of just the optical systems 20, 20' as described above and represented according to FIG. 3. For example, certain edges could be masked and not measurable. The complementary illumination thus allows any shadow zones to be eliminated and information to be added, for example for the reconstruction of ellipses or of non-symmetrical forms. Such complementary illumination can consist of a dome-type lighting or of a combination of a 0° coaxial lighting and a 90° oblique lighting. As a variant, such illumination can consist of the addition of complementary 45° lightings. The complementary illumination is selected to be visible by at least one of the optical sensors 22, 22' of an optical system 20, 20'. Depending on the structures to be revealed, it can be polarized, diffuse or directional, etc.

FIG. 4 thus illustrates such a variant embodiment of FIG. 3, in which the complementary lighting devices, in a semicircle or in a half-torus, operating in the wavelength of the corresponding optical system 20, 20', are positioned on either side of each optical sensor 22, 22'. A first lighting device 23 has a wavelength equal or substantially equal to that of the first optical system 20 whose camera forms the optical sensor 22. Furthermore, it is disposed opposite an outer face 7 of the measurement cell 4 adjacent to that camera. A second lighting device 24 has a wavelength equal or substantially equal to that of the second optical system 20'. It is disposed opposite an outer face 7 of the measurement cell 4 adjacent to the camera forming the optical sensor 22' of this second optical system 20'. Finally, a third lighting device 25 is disposed between the two cameras forming the two optical sensors 22 of the two optical systems 20: the lighting from this third optical system 20 aggregates the corresponding two wavelengths in order to allow visibility by said two cameras.

As a variant, the third lighting device 25 is obtained by disposing a part of a first lighting device 23 and a part of a second lighting device 24 between the two cameras forming the two optical sensors 22, 22' of the two optical systems 20, 20': the lighting thus aggregating the two corresponding wavelengths.

As a variant, the two optical systems can be offset, not located in the same plane. In such a variant, each complementary lighting device can have a form of two semicircles distributed around an optical sensor (a camera) to illuminate a half of a horological component which passes in front of the camera.

Naturally, as a variant, any other type of optical system could be used, and any other associated lighting.

Optionally, one or more passage sensors 26 can also be used to determine the presence of a horological component in a measurement cell 4 and/or to determine the speed of passage of a horological component in the measurement cell 4. For example, a passage sensor 26 can be incorporated at the same level as the optical systems 20, 20', that is to say in the same plane, as represented by FIGS. 3 and 4. As a variant, such a passage sensor 26 can be arranged upstream of the optical systems.

When a passage sensor 26 is incorporated at the same level as the at least two optical systems 20, 20', it is advantageous to choose a sensor operating in a wavelength that is distinct from the wavelengths of said optical systems 20, 20', to avoid any interference. For example, for optical systems 20, 20' operating in the blue and green wavelengths, according to the example described previously, it is possible to select a passage sensor 26 operating in the red wavelength, that is to say for example in the form of a laser operating with a wavelength of 670 nm. In this way, the reflection induced by the passage sensor 26 on a horological component will not be visible by the optical sensors 22, 22' of the optical systems 20, 20'. The passage sensor can detect the horological component directly or via the reflection of the laser on a reflector, and be a barrage sensor, as represented by FIG. 4. Advantageously, the passage sensor 26 is designed to cover the entire width of the measurement channel in order to detect a component accurately, regardless of its orientation in the measurement channel.

In all cases, a passage sensor 26 contributes to the synchronization of the optical systems, that is to say transmits information which allows the at least two optical systems to be triggered simultaneously upon the presence of a horological component to be measured. This passage sensor more specifically transmits information to a driver unit, which will be described hereinbelow, in the form of data representing a time interval corresponding to the presence of a horological component in the measurement cell.

Figure 5:
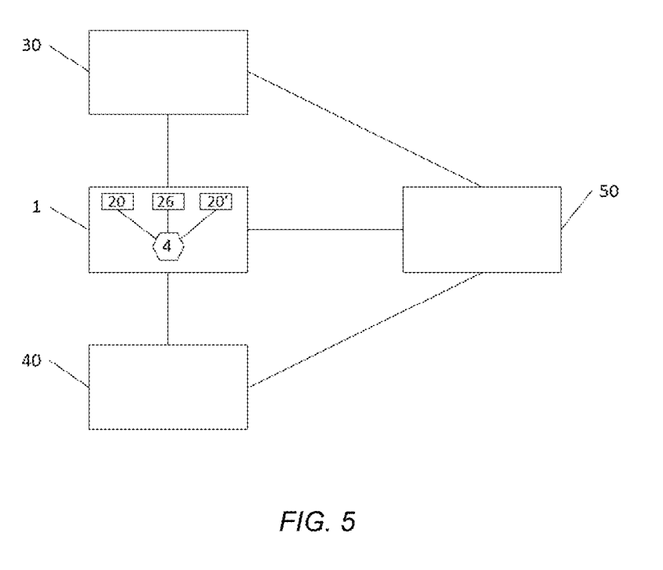
FIG. 5 represents a schematic view of the measurement device linked to a machine-tool, a sorting unit and a driver unit according to an embodiment of the invention.

The measurement device 1 finally comprises a driver unit 50, as represented in FIG. 5, which drives the optical systems 20, 20' and any other sensors of the measurement device. The driver unit 50 thus comprises hardware and/or software means, notably at least one computer and at least one memory, to proceed with the processing of the digital data originating from the optical systems and any other sensors. On this basis, the measurement device implements a method for calculating one or more measurements of a horological component. Furthermore, the measurement device 1 comprises communication devices, arranged between the optical systems and any sensors of the driver unit, so as to allow the exchange of digital data between these elements.

In a variant, the measurement unit or the second measurement unit is positioned upstream of the machining unit in order to know the dimensions of the pieces entering the method.

The principle of calculation of a measurement of a horological component according to the embodiment will now be detailed. As mentioned previously, the at least two optical systems 20, 20' take simultaneous images of the same horological component. These images make it possible to obtain digital data of representation of the same horological component, at the same instant, and according to different orientations. Each of the images can include parallax errors, which are corrected by the use of at least two different images.

As an example, a horological component will be considered below comprising a form organized around an axis of symmetry, such as a balance staff for example, which can take the form simply as the arrangement of several cylindrical portions of different diameters arranged around this axis of symmetry. In such a case, a useful measurement can be the maximum diameter of the horological component, even any other diameter obtained over a certain section. In addition, another useful measurement can be the length of the horological component, measured along its axis of symmetry. Similarly, this approach applies equally to any component exhibiting a quasi-symmetry about an axis.

The first optical system 20 of the measurement device makes it possible to measure, for a horological component, dimensions in a first plane X, for example at least a length $L_x$ and at least one diameter $D_x$. In addition, a first angle $\alpha_x$ of the horological component with respect to the axis of its measurement channel, i.e. the longitudinal direction, forming a reference direction of the measurement cell, is measured.

A second optical system 20' makes it possible to measure the same measurements for the same horological component, but in a second plane Y, by virtue of the different orientation of the second optical system, which makes it possible to obtain a length $L_y$ and at least one diameter $D_y$. A second angle $\alpha_y$ of the horological component is measured with respect to the axis of its measurement channel, i.e. the longitudinal direction.

It is possible to repeat the above measurements for each of any other optical system, in the case where the measurement device comprises more than two optical systems.

Note that, for cylindrical components or components of symmetrical form about an axis, as mentioned above, two optical systems are sufficient to achieve the accuracy sought. For a horological component of more complex three-dimensional form, a third optical system, even a fourth or even more, could be necessary.

The different images obtained by each optical system make it possible to calculate the effective length of a horological component, from the lengths visible on each image, by taking account of the abovementioned angles $\alpha_n$. Each measurement obtained is possibly effected by parallax or projection error. However, a corrected measurement is obtained by mathematical processing. This approach thus makes it possible to correct the parallax errors.

In a variant, when the images taken by the different optical systems partially overlap, a stereoscopic reconstruction can complement the measurements.

Note that the principle described above applies in the case where at least two optical systems 20, 20' have proceeded to simultaneously take an image of the same horological component. This instant of taking of the views can be optimized by the use of a possible passage sensor 26, as explained previously, under the control of the driver unit. As a variant, a clock can simply allow the coordination of the at least two optical systems. According to a variant embodiment, these optical systems 20, 20' can each take several successive views of the same horological component, for example in bursts, while remaining coordinated with one another for these views to remain simultaneous between each optical system. Such a variant allows several views per optical system to be taken into account, which further increases the accuracy.

The driver unit 50 of the measurement device can also comprise communication devices for automatically communicating with additional external devices, such as a sorting unit 40 or a cleaning unit downstream, and/or a machining unit upstream.

As an advantageous example, the driver unit or any additional unit can perform a qualitative estimation of a horological component, through a step of comparison of at least one calculated measurement with an expected theoretical measurement, which forms a reference value. Based on this comparison, it is possible to determine if the quality obtained is satisfactory or not, by comparison with a predetermined quality threshold for example. In addition, if the quality of the horological component is insufficient, an additional step of automatic correction of the machining unit can be implemented, by translating the bad measurement obtained into an adjustment of the machining unit. This approach can be reiterated several times until a satisfactory measurement is achieved. Note that, according to an advantageous variant embodiment, the control and/or the correction of a machining unit is performed in real time or in quasi-real time, for example on the basis of short servo-control. Possible driving of a downstream unit can also be managed automatically and/or in real time or quasi-real time by the driver unit. Such a downstream unit can, for example, be a sorting unit for sorting the horological components, according to the conformity or non-conformity of the measurements performed, according to batches by ranges of dimensions, according to batches comprising a predetermined number of components, etc.

Thus, the invention also relates to a device for manufacturing a horological component, wherein it comprises a machining unit and a measurement device as described previously, comprising an introduction part allowing the transmission to the measurement device of a horological component obtained from a machining unit, without prior cleaning.

The measurement unit can also comprise a human-machine interface, which can be linked to the driver unit. The human-machine interface can comprise a display screen on which the calculated measurement or measurements are displayed. This human-machine interface can also display a reference value of each measurement, a result of the quality diagnosis of a horological component, and/or setting values of a machining machine. The human-machine interface can also comprise means for inputting data and commands by an operator.

As mentioned previously, the measurement device according to the invention makes it possible to measure a horological component in the form of an object of revolution. A horological component can be of millimetric size. It naturally also allows dimensions of any horological component, which can take any form, not only according to an object of revolution, to be measured.

More generally, the invention offers the following advantages:

- it is suitable for carrying out at least one measurement of a horological component at high rates, notably because it is implemented on a horological component in motion and it avoids positioning a horological component statically on a fitting to precede with its measurement;
- it also makes it possible to obtain great accuracy and not suffer the phenomenon of distortion of the optical quantities as a function of working distance, a warping of the horological component due to it not being perpendicular in the optical field, and the effects of diffraction and of diffusion of the oblique light on the edges of the component;
- it is suitable for operating in an environment compatible with a machining environment. Indeed, it applies notably to a horological component placed in a liquid of predetermined kinematic viscosity, compatible with the recovery of a horological component on leaving a machining machine, possibly covered with oil used by said machine, without the need to clean the horological component;
- it is simple because the measurement is performed on a free horological component, that is to say one in free motion immersed in a liquid.

To sum up, as emerges from the description above, the measurement device according to the invention makes it possible to guide a horological component by a conveying system to a measurement cell, such that it passes into a measurement zone, that is to say into the focal plane of the at least two optical systems of the measurement device, at a predetermined speed. In this measurement zone, the optical systems each simultaneously collect one or more images. These images are transmitted in digital data format to a driver unit, which notably comprises image analysis software, allowing it to extract the dimensions sought for the horological component, by taking account of the simultaneous measurements of each optical system. The dimensions obtained at the very least make it possible to transmit a result on the quality of the horological components manufactured, and possibly proceed with rapid tracking of machining drifts, and adjust/correct machining parameters, even stop a machining machine and limit the number of non-conforming horological components by interacting with the control unit of the machining machine and/or by transmitting information in real time to an operator of said machining machine.

The invention also relates to a process for measuring a horological component, implemented by the driver unit of the measurement device described previously, which comprises the following steps:

setting in motion of a horological component in a liquid in a measurement channel of a measurement cell;

optionally, detection of the horological component by a detection sensor and transmission of the detection data to a driver unit;

driving of at least two optical systems by a driver unit for the taking of simultaneous images at the moment of passage of the horological component in a measurement zone of a measurement cell;

transmission of digital data representative of the images obtained by the at least two optical systems to a driver unit;

calculation of at least one dimension of the horological component by a computer of the driver unit from said digital data.

The method for measuring a horological component can comprise the simultaneous taking of several images during a free displacement of the horological component, according to a speed of displacement that has a non-zero component in the longitudinal direction of the measurement channel of a measurement cell, said speed lying between 70 and 180 mm/s inclusive.

In addition, the invention also relates to a method for manufacturing a horological component, comprising the implementation of the measurement method described previously, and which additionally comprises all or part of the following additional steps:

comparison of the dimensions of the horological component calculated by said computer of the driver unit with reference dimensions to determine whether the horological component is in conformity or not;

transfer of the component to a dedicated storage zone, based on the result of the comparison;

in the case of a non-conforming horological component, calculation of machining correction data as a function of the calculated dimensions of the horological component, and transmission of the correction data to a machining unit, and/or transmission of an alert to an operator.

This manufacturing method additionally advantageously comprises a preliminary phase of manufacturing of a horological component via a machining machine. It also comprises the guiding of a horological component obtained from this machining machine directly to the measurement device, without prior cleaning.

Naturally, the invention can apply to any horological component, such as a balance staff, or any other shaft, or a pinion, a horological component of revolution, with a cylindrical symmetry, or a horological component that is not cylindrical or not symmetrical, such as the square or the hook of a barrel arbor.

The invention claimed is:

1. A device for measuring a horological component, wherein the device comprises:
   (a) a measurement cell comprising:
      (i) a measurement channel extending in a longitudinal direction and filled with a liquid, capable of displacing a horological component;
      (ii) outer faces that are flat and parallel pairwise,
   (b) at least two optical systems arranged opposite at least a part of the outer faces of the measurement cell at a measurement zone of the measurement cell, each of the optical systems comprising:
      (iii) a light emitter suitable for emitting a collimated light in a predefined wavelength or a defined polarization in the direction of the measurement channel through an outer face of the measurement cell, so as to be able to illuminate a horological component present and being displaced in the measurement channel in the measurement zone, and
      (iv) an optical sensor associated with the light emitter for receiving at least a part of the light emitted by the light emitter,
   the at least two optical systems comprising light emitters operating in different respective wavelengths or polarizations,
   (c) a driver unit, capable of driving the optical systems and of processing digital data obtained from the optical systems, configured to implement calculations of at least one dimension of a horological component.

2. The device for measuring a horological component as claimed in claim 1, wherein the measurement cell is made of a material that is transparent to the wavelengths of the at least two optical systems, wherein the measurement cell has a polygonal outer section which forms the outer faces, the outer faces having a surface area greater than or equal to the surface area of the field of view of an optical system arranged opposite, and wherein the measurement cell has a round internal section delimiting the measurement channel.

3. The device for measuring a horological component as claimed in claim 1, wherein the at least two optical systems are positioned in the same plane at right angles to the longitudinal direction of the measurement channel, the at least two optical systems being angularly offset relative to one another.

4. The device for measuring a horological component as claimed in claim 1, wherein the respective light emitters of the at least two optical systems operate at a respective wavelength in a range of from 435 to 500 nm and in a range of from 495 to 570 nm, respectively.

5. The device for measuring a horological component as claimed in claim 1, wherein the measurement channel of the measurement cell is arranged to allow free displacement of the horological component, in a static liquid by gravitation or by entrainment by the liquid in laminar flow, by gravitation, or both in laminar flow and by gravitation.

6. The device for measuring a horological component as claimed in claim 5, wherein the device is arranged for displacement of a horological component at a speed in a range of from 70 to 180 mm/s, and comprising at least one component of non-zero displacement in the longitudinal direction of the measurement channel.

7. The device for measuring a horological component as claimed in claim 1, wherein the liquid of the measurement channel is a liquid having a kinetic viscosity in a range of from 2 to 50 $mm^2/s$.

8. The device for measuring a horological component as claimed in claim 1, wherein refractive indices of the liquid and of the material of the measurement cell are substantially identical.

9. The device for measuring a horological component as claimed in claim 1, wherein the device further comprises complementary lighting devices arranged alongside optical sensors of the at least two optical systems to enhance a perception of the at least two optical systems.

10. The device for measuring a horological component as claimed in claim 1, wherein the driver unit is configured to drive the at least two optical systems so as to synchronize the at least two optical systems so that each of the at least two optical systems takes at least one simultaneous image of a same horological component.

11. The device for measuring a horological component as claimed in claim 1, wherein the driver unit comprises a computer configured to implement calculations of at least one dimension of a horological component by a computer program, to assess conformity or non-conformity of the horological component with respect to reference data.

12. The device for measuring a horological component as claimed in claim 11, wherein the computer is configured to perform the calculation of a length of a horological component, of a dimension transversal to the length, which corresponds substantially to a diameter of a horological component when the horological component has a symmetry of revolution, and of an angle between the direction of the length and the longitudinal direction of the measurement channel.

13. The device for measuring a horological component as claimed in claim 1, wherein the device comprises a detection sensor capable of detecting a presence, and optionally a speed, of a horological component being displaced in the measurement channel of the measurement cell.

14. The device for measuring a horological component as claimed in claim 13, wherein the detection sensor operates on the basis of a wavelength that is different from a wavelength of the at least two optical systems.

15. The device for measuring a horological component as claimed in claim 1, wherein
the device comprises an arrangement allowing a horological component to be transferred to an input and oriented toward the measurement channel of the measurement cell, capable of transferring a horological component, directly without cleaning, from an output of a machining machine to the measurement channel.

16. The device for measuring a horological component as claimed in claim 1, wherein the device is capable of measuring a horological component of revolution, with a cylindrical symmetry and a horological component that is not cylindrical or not symmetrical.

17. A device for manufacturing a horological component, wherein the device comprises a machining unit and a measurement device as claimed in claim 1, and wherein the device for manufacturing a horological component comprises an introduction part allowing a horological component to be transferred from the output of the machining unit to a measurement cell of the measurement device without intermediate cleaning.

18. A method for measuring a horological component, wherein the method comprises:
setting in motion a horological component in a liquid in a measurement channel of a measurement cell;
optionally, detecting the horological component by a detection sensor and transmitting the detection data to a driver unit;
driving at least two optical systems by a driver unit for simultaneous images to be taken at the moment of passage of the horological component in a measurement zone of a measurement cell;
transmitting digital data representative of the images obtained by the at least two optical systems to a driver unit;
calculating at least one dimension of the horological component by a computer of the driver unit from the digital data.

19. The method for measuring a horological component as claimed in claim 18, wherein the method comprises simultaneously taking several images during a free displacement of the horological component, according to a speed of displacement that has a non-zero component in a longitudinal direction of the measurement channel of the measurement cell, the speed being in a range of from 70 to 180 mm/s.

20. The method for measuring a horological component as claimed in claim 18, wherein the method comprises at least one of the following:
comparing at least one dimension of the horological component calculated by the computer of the driver unit with at least one reference dimension to determine whether the horological component is in conformity or not;
transferring the horological component to a dedicated storage zone;
in the case of a nonconforming horological component, calculating at least one machining correction datum as a function of the at least one calculated dimension of the horological component, and transmitting the at least one correction datum to a machining unit, an alert to an operator, or both the at least one correction datum to a machining unit and an alert to an operator.

21. The device for measuring a horological component as claimed in claim 1, wherein the device comprises an arrangement allowing a horological component to be transferred at an output of the measurement channel and oriented toward a cleaning, storage and/or rejection unit, depending on a conformity of calculated dimension or dimensions.

* * * * *